Figure 1:
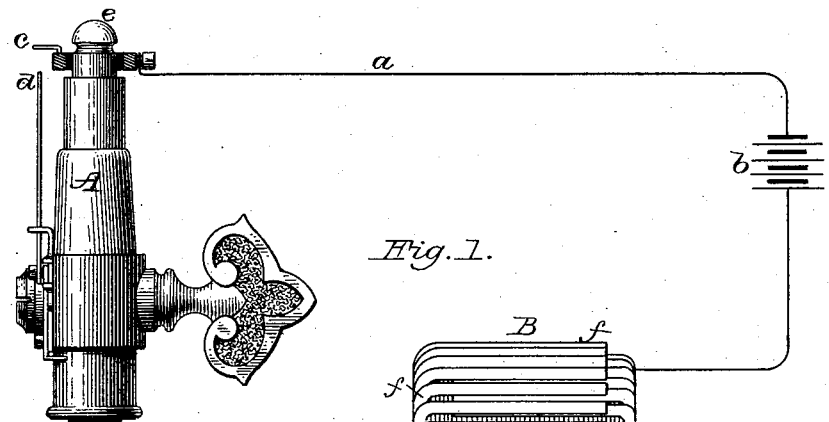

(No Model.)

R. EICKEMEYER.
SPARKER COIL FOR GAS LIGHTING.

No. 375,614. Patented Dec. 27, 1887.

Attest:
Philip F. Larner
Howell Bartle

Inventor:
Rudolf Eickemeyer
By Wm. C. Wood
Attorney.

UNITED STATES PATENT OFFICE.

RUDOLF EICKEMEYER, OF YONKERS, NEW YORK.

SPARKER-COIL FOR GAS-LIGHTING.

SPECIFICATION forming part of Letters Patent No. 375,614, dated December 27, 1887.

Application filed August 23, 1887. Serial No. 247,673. (No model.)

*To all whom it may concern:*

Be it known that I, RUDOLF EICKEMEYER, of Yonkers, in the county of Westchester and State of New York, have invented certain new and useful Improvements in Sparkers and Sparker-Coils in Electric Gas-Lighting Apparatus; and I do hereby declare that the following specification, taken in connection with the drawings furnished and forming a part of the same, is a clear, true, and complete description of my invention.

In apparatus for lighting gas by means of an electric spark it is usual to employ, as a means for intensifying the sparks, a coil in circuit with the main conducting-wire and inclosing an iron core. I have discovered that more uniform, reliable, and efficient results will accrue in a sparker if the line-wire or a coil thereof be so combined with the magnetic metal as to completely close the magnetic circuit; and the main feature of my invention, broadly stated, consists in the combination, in an electric gas-lighting circuit, of insulated wire in said circuit and an inclosing body of magnetic metal, which, when magnetized by a current in the circuit-wire, affords a closed magnetic circuit. The form into which the said insulated line-wire may be put, as well as the form of the inclosing-body of magnetic metal, may be largely varied without departure from the said main feature of my invention—as, for instance, in its simplest form a considerable length of insulated line-wire may be wrapped and thereby inclosed by soft-iron wire; or said line-wire may be in a spiral-coil form and incased within a soft-iron tube; or said line-wire may be in many convolutions to form a ring, and this in turn wrapped and inclosed by soft-iron wire or by a two-part shell of iron; or said line-wire may be in a cylindrical coil and numerous iron wires placed therein, and each bent outward at the ends and made to overlap each other at the sides, thus inclosing said coil with magnetic metal and affording a closed magnetic circuit, and so on through many other variations, which will be readily suggested to persons skilled in the art when cognizant of the disclosures herein made.

After describing in detail the several forms of my novel sparkers and sparker-coils, (illustrated in the drawings,) the features deemed novel will be duly specified in the several clauses of claim hereunto annexed.

Figures 2, 3:
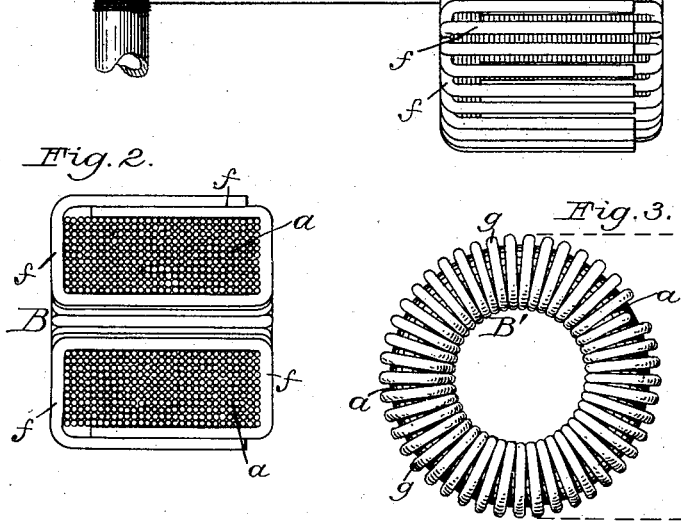
Figures 4, 5:
Figure 6:
Figure 7:

Figure 1 illustrates a well-known type of electric gas-lighting apparatus embodying my improved sparker-coil in one of its desirable forms. Fig. 2 illustrates the sparker-coil of Fig. 1 detached and in longitudinal section. Fig. 3 in side view and diametric section illustrates another form of my said improved sparker-coil. Fig. 4 in diametric section illustrates another form of my sparker-coil, in which each convolution of the line-wire has its own coil of magnetic metal. Fig. 5 illustrates a straight length of line-wire inclosed within a coil of magnetic metal. Fig. 6 illustrates a straight tube of magnetic metal inclosing a straight length of line-wire. Fig. 7 illustrates shells of magnetic metal for inclosing such coils as are shown in Figs. 3 and 4, whether the iron wire be used therewith or not.

In the drawings, Fig. 1, a single gas-burner, A, is shown; but it is to be understood that many such would ordinarily be included in the one line or sparking circuit $a$, which, with the battery $b$ and contacts $c$ and $d$, by which sparks are developed and located adjacent to the tip $e$ of the burner, are all as heretofore, and are too well known to require any special description.

The sparker B is located, as heretofore, on said line or sparking circuit $a$, and it may be at any proper and convenient point between the burner and the battery or other suitable electric generator. This sparker is novel, in that so far as I know it is the first sparker, in combination with battery, gas-burners, and sparking contacts, wherein the magnetic metal affords a closed magnetic circuit when influenced by the electric current passing from the battery to the contacts prior to their separation for developing the gas-lighting spark. As shown in Figs. 1 and 2, the line or sparker circuit-wire $a$ is formed into a cylindrical helix, which is completely incased or inclosed within a series of soft-iron wires, $f$, each of these being bent outward at the ends thereof, and thence bent backward and overlapping upon the outside of the insulated circuit-wire coil or helix.

Considered as a mere electro-magnet, embodying a helix and the inclosing iron wires, this structure is not new, similarly-arranged iron wires having been employed for inclosing the two coils or helices of an induction-coil, for the purpose of improving the character of the induced currents in the secondary coil, as will appear from British Letters Patent to Varley, No. 3,059, of A. D. 1856; but, so far as I know, I am the first to discover the value of a closed magnetic circuit in a sparker, whereby the electric impulses in a circuit are materially intensified for producing gas-lighting sparks, whether the sparking-circuit includes a coil, as always heretofore, or said circuit be without a coil, inasmuch as I have further discovered that if a sufficient length of straight insulated line or circuit wire be incased by or inclosed within magnetic metal, a closed magnetic circuit is afforded and an efficient sparker thereby produced, as will hereinafter be more fully described.

Referring now to Fig. 3, it will be seen that the sparker B', there shown, consists of an annular coil of insulated circuit-wire, $a$, and this in turn is wrapped by a continuous length of iron wire, $g$, thus completely inclosing the many convolutions of the insulated circuit-wire within magnetic metal, affording a closed magnetic circuit.

In Fig. 4 the sparker $B^2$ is similar in form to that in Fig. 3; but in this case the insulated circuit-wire $a$ is first wrapped with soft-iron wire $h$, and then the whole is coiled into annular form into several convolutions, which are securely fastened together by binding wires or twine $h'$.

In Fig. 5 the sparker $B^3$ consists of a straight length of insulated line-wire, $a$, inclosed within the iron wire $i$.

In Fig. 6 the sparker $B^4$ consists of a straight length of insulated wire, $a$, snugly inclosed within an iron tube, $k$, which affords a closed magnetic circuit.

These forms of sparkers $B^3$ and $B^4$ are of practical efficiency—as, for instance, an iron tube twelve feet in length inclosing a corresponding length of insulated circuit-wire will afford a highly satisfactory spark, thus indicating that the coiling of the circuit-wire, heretofore deemed essential, is not material if a closed magnetic circuit be employed in any manner with said circuit-wire, so as to materially facilitate that prompt electric discharge which is obviously desirable in this type of gas-lighting apparatus.

In lieu of wrapping with iron wire, as in sparker B', Fig. 3, an iron casing may be used of the annular form illustrated in Fig. 7, it being constructed in two parts, $l$ $l'$, and arranged to snugly embrace the circuit-coil, the two parts then being firmly united in any suitable manner. So, also, may such a casing be profitably employed with the sparker $B^2$, Fig. 4, notwithstanding the presence of the iron wire $h$.

Having thus described my invention, I claim as new and desire to secure by Letters Patent—

1. The combination, in a gas-lighting electric circuit, of insulated wire included in said circuit, and an inclosing body of magnetic metal, which, when magnetized by a current in said circuit-wire, affords a closed magnetic circuit, substantially as hereinbefore described, for intensifying the electric discharge requisite for developing sparks at the tips of gas-burners.

2. The combination, with one or more gas-burners provided with electric contacts for developing and locating sparks at or near the tips of said burners, of an electric generator, a "sparker" consisting of insulated wire in the sparking-circuit, and magnetic metal which incloses said wire and affords a closed magnetic circuit during the passage of an electric current in said insulated wire and facilitates a prompt electrical discharge.

3. In a gas-lighting electric circuit, the combination of a coil of insulated wire in said circuit, and a wrapping of iron wire, substantially as described, said coil and its wrapping constituting a sparker having a closed metallic circuit.

RUDOLF EICKEMEYER.

Witnesses:
 JAMES S. FITCH,
 R. D. SAWYERS.